(12) United States Patent
Köhler et al.

(10) Patent No.: US 8,108,107 B2
(45) Date of Patent: Jan. 31, 2012

(54) SAFETY SYSTEM

(75) Inventors: Armin Köhler, Sachsenheim (DE);
Reiner Marchthaler, Gingen (DE);
Thomas Lich, Schwaikheim (DE);
Frank Mack, Seoul (KR)

(73) Assignee: Robert Bosch GmbH, Stuttgart (DE)

( * ) Notice: Subject to any disclaimer, the term of this patent is extended or adjusted under 35 U.S.C. 154(b) by 751 days.

(21) Appl. No.: 11/883,712

(22) PCT Filed: Dec. 19, 2005

(86) PCT No.: PCT/EP2005/056889
§ 371 (c)(1),
(2), (4) Date: Nov. 10, 2008

(87) PCT Pub. No.: WO2006/081897
PCT Pub. Date: Aug. 10, 2006

(65) Prior Publication Data
US 2010/0063686 A1 Mar. 11, 2010

(30) Foreign Application Priority Data
Feb. 2, 2005 (DE) .......... 10 2005 004 742

(51) Int. Cl.
*B60R 22/00* (2006.01)
(52) U.S. Cl. .......... 701/45; 180/274; 180/282; 280/735
(58) Field of Classification Search .......... 280/735; 701/45; 180/274, 282
See application file for complete search history.

(56) References Cited

U.S. PATENT DOCUMENTS

| 5,413,378 | A | * | 5/1995 | Steffens et al. | 280/735 |
| 5,540,461 | A | * | 7/1996 | Nitschke et al. | 280/735 |
| 7,026,946 | B2 | * | 4/2006 | Saunders et al. | 340/666 |
| 7,239,945 | B2 | * | 7/2007 | Hiemer et al. | 701/29 |

FOREIGN PATENT DOCUMENTS

| DE | 195 46 297 | 6/1997 |
| DE | 101 26 452 | 7/2002 |
| DE | 102 33 098 | 10/2002 |
| DE | 102 46 255 | 4/2004 |
| DE | 102 52 227 | 5/2004 |
| DE | 103 07 848 | 9/2004 |
| JP | 7-186879 | 7/1995 |
| JP | 2000-62997 | 2/2000 |
| JP | 2001-247005 | 9/2001 |
| JP | 2001-270417 | 10/2001 |
| WO | 02/053419 | 7/2002 |

OTHER PUBLICATIONS

W. Suchowerskyj, entitled "Evolution en matière de detecteurs de choc" (Development of impact sensors), in 1141 Ingénieurs de l'Automobile (1982) No. 6, pp. 69 through 77, Paris.

* cited by examiner

*Primary Examiner* — Eric Culbreth
(74) *Attorney, Agent, or Firm* — Kenyon & Kenyon LLP

(57) ABSTRACT

A safety system for vehicle occupants having a device for determining the position of the vehicle occupant. A status monitor to which the output signals of sensors are conveyed is provided for determining the position of the vehicle occupant, the sensors detecting the acceleration of the vehicle and the weight of the vehicle occupant. A method for controlling a safety system.

11 Claims, 2 Drawing Sheets

SAFETY SYSTEM

FIELD OF THE INVENTION

The present invention relates to a safety system and a method for controlling a safety system. Safety systems are used in vehicles for the protection of vehicle occupants.

BACKGROUND INFORMATION

A safety system for the protection of vehicle occupants is known from the article by W. Suchowerskyj, entitled "Evolution en matiére de detecteurs de choc" (Development of impact sensors), in 1141 Ingénieurs de l'Automobile (1982) No. 6, pages 69 through 77, Paris, for example. Acceleration-sensitive sensors are essentially used as crash sensors in such safety systems. The evaluation of their output signals should make it possible to recognize dangerous crashes as early as possible in order to trigger safety measures in the event of danger, in particular deployment of restraining means for the vehicle occupants. However, even after the introduction of the airbag, serious or even deadly injuries of vehicle occupants have regrettably occurred time and again, despite relatively low speeds. In most of those cases, the vehicle occupants were not buckled up or were placed very close in front of the airbag module used as restraining means. In order to provide the vehicle occupants with optimum protection in the event of an accident, it is necessary to know both the upper body and head positions of the vehicle occupant prior to the ignition of the airbag. It is known to determine the position and motion dynamics of vehicle occupants using IOS sensors (video camera, OC mat (occupant classification), force measuring pin, strain gauge, etc.) and to classify the occupant (German Patent Application No. DE 102 33 098) with the aid of the knowledge of the accelerations acting upon the occupant in both the x and y directions (DIN 70000). Moreover, it is also possible to predict the trajectory of an occupant (German Patent Application No. DE 102 46 255) using the same information (occupant dynamics and accelerations).

SUMMARY OF THE INVENTION

The present invention enables improvement on the known safety systems which are now in the position to detect the events in the passenger compartment of a motor vehicle more accurately and thereupon to change the inflating behavior of an airbag provided as a restraining means. Therefore, depending on the situation, the airbag may be inflated less aggressively or not at all when an occupant is situated in the inflating range of the airbag.

This is achieved in particular in that more reliable information about the occupants and their position with respect to an airbag is detected even before an accident occurs. This information then makes it possible to adjust the airbag individually and thus optimally to the type of accident (frontal crash, side crash, rear end crash, etc.) and to the occupants involved. A novel method for classifying and locating occupants is used for this. The advantages are in particular that improved occupant protection is possible by determining the position of a vehicle occupant more accurately without incurring additional costs for a new sensor system, at least in modern passenger cars. These vehicles already have the necessary acceleration sensors for crash sensing and the sensors for determining the weights of vehicle occupants. It is even conceivable that in the future insurance companies will offer more favorable insurance policies for vehicles having such restraint systems due to the reduced risk of injuries and thus lower recovery costs. The position of vehicle occupants may be detected particularly advantageously using status monitors which analyze the output signals of sensors.

DETAILED DESCRIPTION

Figure 1:
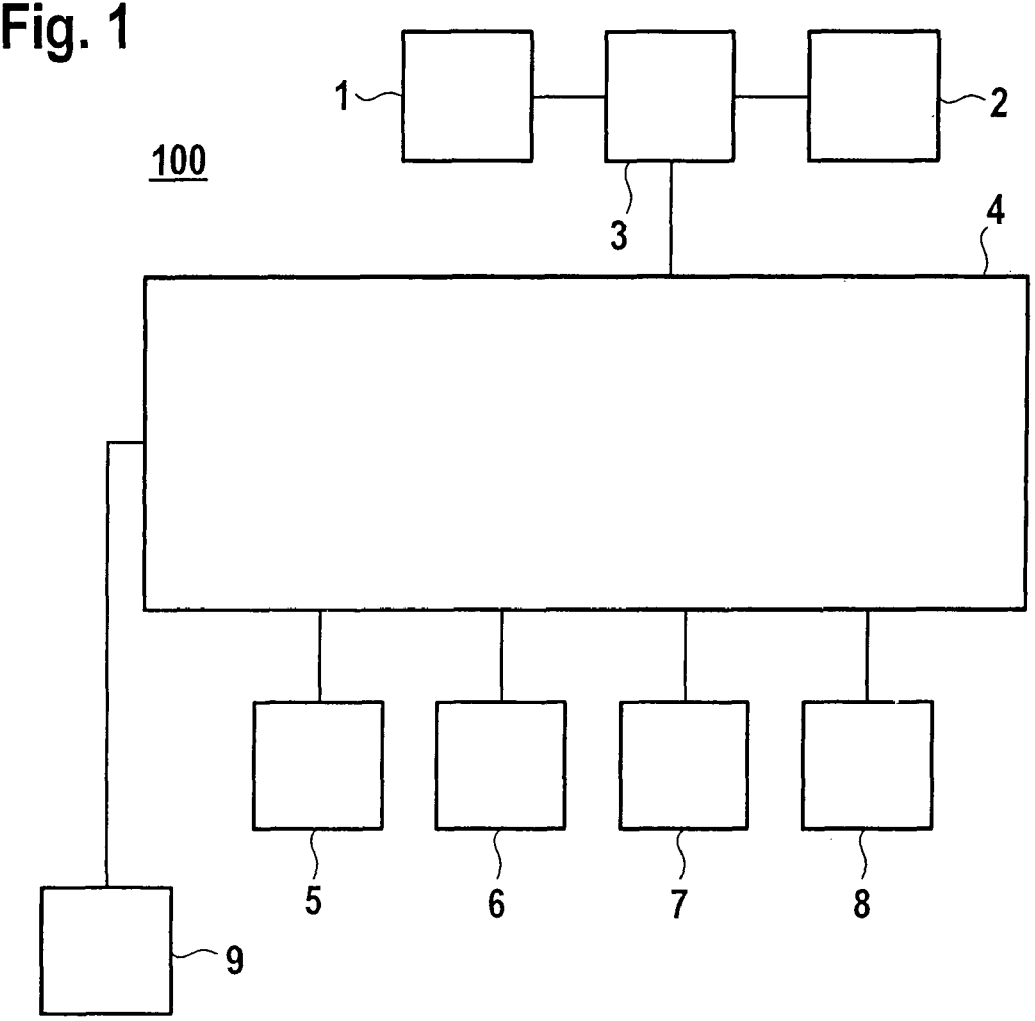
FIG. 1 shows a block diagram of a safety system.

FIG. 1 shows a block diagram of a safety system 100. Safety system 100 includes at least one sensor 1 which detects the weight of vehicle occupants. For this purpose, sensor 1 is preferably situated in a vehicle seat. Furthermore, safety system 100 includes at least one sensor 2 which is sensitive to acceleration. Sensors 1 and 2 are connected to a function module 3 which analyzes the signals of sensors 1, 2. This analysis relates in particular to the localization and classification of vehicle occupants. Function module 3 is connected to a control unit 4. Additional sensors 5, 6, 7, 8 are connected to control unit 4. These sensors measure operating parameters such as acceleration and rotational speed about the axes of the vehicle in particular. Furthermore, these sensors detect an impact on the vehicle, in the vehicle's front, side, or rear end areas. Moreover, control unit 4 is connected to restraining means 9, such as airbags, seatbelt tensioners, and the like. In a critical accident situation, control unit 4 also takes into account the output signal of function module 3 in addition to the output signals of sensors 1, 2, 5, 6, 7, 8. This function module provides information about the vehicle occupants and their positions. By utilizing this information, it may be decided when a side crash occurs, for example, whether the airbags are activated at all or are only partially inflated.

The present invention is based on the realization that, due to modeling of the occupant and his/her connection via spring-damping systems to the vehicle and the weight sensors mounted in the seat, the initially unknown position of the occupant can be estimated considerably more accurately than previously with the aid of force sensors and acceleration sensors and by using at least one monitor. These monitors may advantageously be implemented as monitors having an a priori structure, e.g., of the type of a Luenberger observer, or as monitors having an a posteriori structure, e.g., as a Kalman filter. The Kalman filter is particularly suitable to be implemented on microcontrollers due to its recursive formulas. The monitor is then in the position to compensate model inaccuracies, as well as interfering factors such as the occupant hitting the side door of the vehicle. Unknown model variables or model variables only very difficult to ascertain are advantageously determined using a parameter identifier in order to make an estimation of the occupant's position as accurate as possible.

Figure 2:
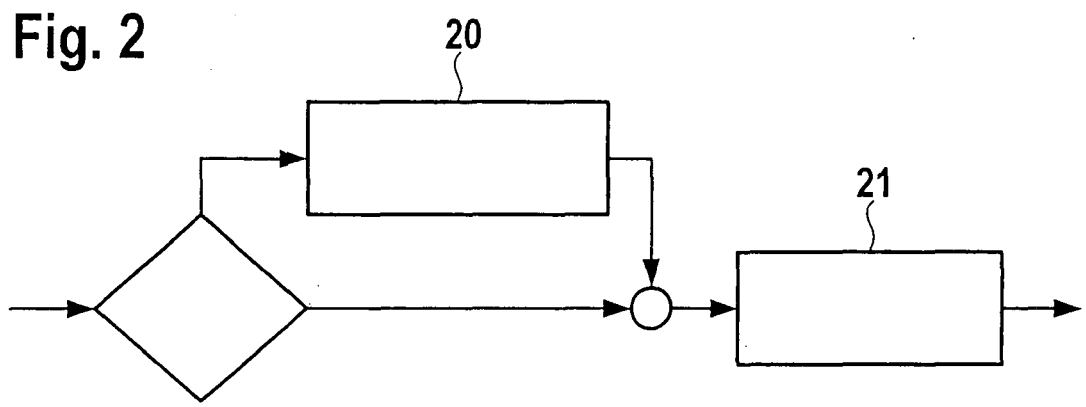
FIG. 2 shows another block diagram for the situation-dependent disconnection of the parameter identifier.

Function module 20 shown in FIG. 2 is provided for this. As is apparent from the block diagram shown in FIG. 2, this parameter estimator may advantageously be operated in addition to a status monitor 21 and may also be switched off, depending on the situation.

Figure 3:
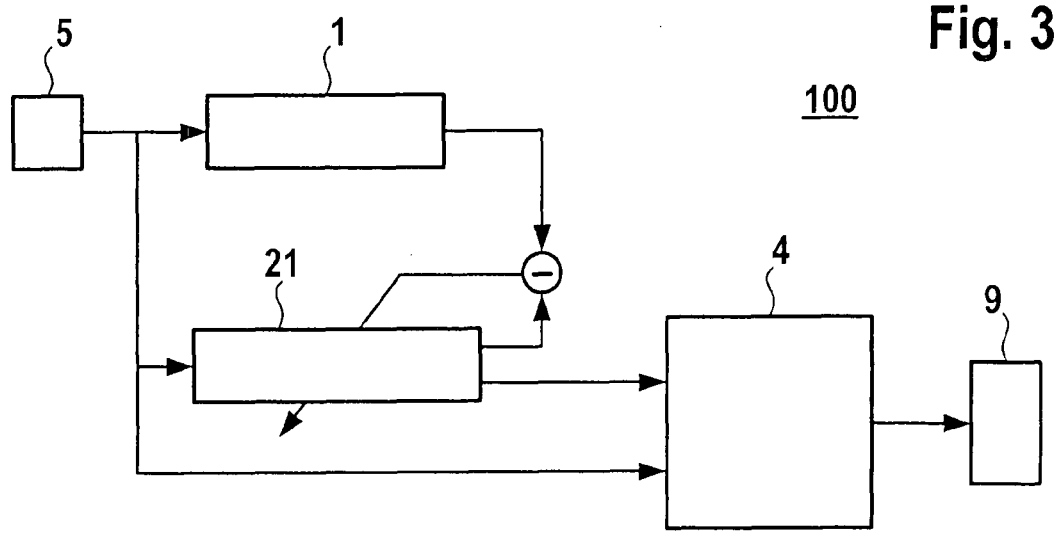
FIG. 3 shows another block diagram for elucidating a frontal crash.

The operating mode of safety system 100 is explained in the following on the basis of several typical accident situations. First, the series of events during a frontal crash is considered with reference to FIG. 3. The vehicle experiences a strong negative acceleration during a frontal crash. An output signal is generated from a sensor 5 which is sensitive to acceleration. The vehicle occupant moves forward due to the deceleration of the vehicle. This movement of the vehicle occupant causes a change in the force in the z direction F(t) which acts on the seat in which the occupant sits. This force is measured by weight sensor 1. The output signals of sensors 1 and 5 are conveyed to status monitor 21. Based on the information from sensor 5 and sensor 1 in the seat, the occupant's position may be estimated with the aid of status monitor 21. The occupant's position ascertained by status monitor 21 is subsequently conveyed to control unit 4. Control unit 4 also receives the output signal of sensor 5. Control unit 4 then ascertains the exact ignition point for restraining means 9, e.g., via integration of the acceleration signal and a comparison with a predefinable threshold value.

Figure 4:
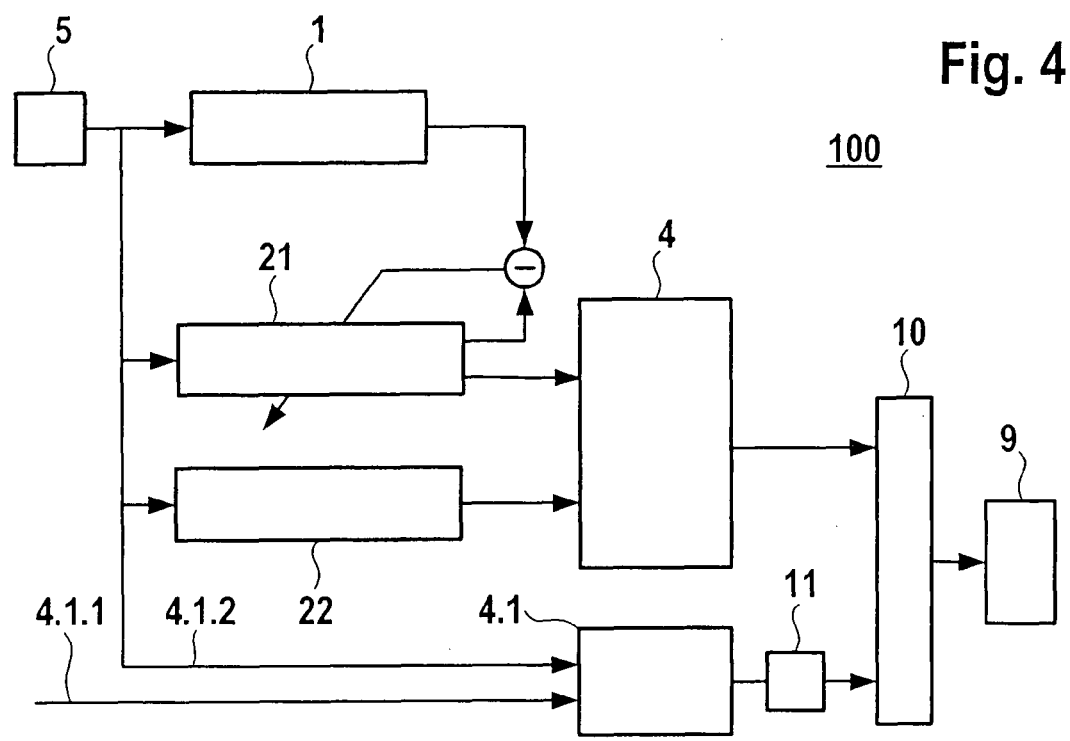
FIG. 4 shows another block diagram for elucidating a side crash and/or a rollover crash.

The operating mode of safety system 100 during a side and/or rollover crash is described in the following with reference to the diagram shown in FIG. 4. The acceleration occurring during this accident event is again detected by an acceleration-sensitive sensor 5. The lateral movement of the vehicle occupant caused by the laterally acting force is detected by sensor 1. The output signals of sensors 1 and 5 are conveyed to a status monitor 21 which generates a first model of the laterally directed movement of the vehicle occupant. The output signal of status monitor 21 is conveyed to control unit 4. Control unit 4 in turn controls the triggering of restraining means 9. However, if the occupant is situated in what is known as a "keep out zone" at the point in time of the triggering decision, which should be taken by control unit 4, restraining means 9, e.g., an airbag, may not be triggered. "Keep out zone" refers to an area in the vehicle's passenger compartment where use of a restraining means does not appear to be meaningful when a vehicle occupant is in that area. The use may appear not to be meaningful due to the fact that the restraining means hardly contributes to the protection of a vehicle occupant or even puts him/her in danger. For example, triggering of a front-seat passenger airbag would seriously endanger a front-seat passenger who is momentarily seated in a position bent forward toward the windshield. The "keep out zone" is advantageously determined with the aid of second status monitor 22 which, however, takes into account only the signals of sensor 5, i.e., the acceleration of the vehicle, and not, however, the signals of sensor 1, i.e., the weight of the vehicle occupant.

The approach for determining the "keep out zone" with the aid of the movement of the center of gravity of a vehicle occupant is based on the fact that the position of the center of gravity is estimated by two status monitors 21, 22 using two different methods. One method determines the position of the occupant with the aid of first status monitor 21. This status monitor 21 detects, for example, the occupant's impact on the vehicle door and then outputs the actual position. If, simultaneously with the estimation of first status monitor 21, a second estimation is carried out using a second status monitor 22 which only takes into account the acceleration of the vehicle and not, however, the output signals of the weight sensors, the position of the vehicle occupant changed by external interference, e.g., the impact on the door, cannot be corrected using this second estimation. Both estimation methods provide different results in this case.

The results of both estimation methods (status monitors 21, 22) are compared in function module 4.1. The result of this comparison is preferably compared to a predefinable threshold value. If this threshold value is exceeded, it is assumed that the vehicle occupant is situated in the "keep out zone."

Restraining means 9 are not triggered in this case. However, if the threshold value is not reached, restraining means 9 are triggered.

A side crash and/or rollover crash is/are detected by a function module 4.1 which may advantageously be a component of control unit 4. Gating between the two decision alternatives, triggering or non-triggering of restraining means 9, advantageously takes place via logical AND-gating in function module 10. Using this system design, it is advantageously also possible to trigger restraining means 9, an airbag in particular, in a delayed manner. Should the occupant be situated in the "keep out zone" during the triggering decision about the presence of the side or rollover crash, but, shortly thereafter, moves away from the "keep out zone" due to the violent impact on the door, the side airbag may be ignited in a time-delayed manner as soon as the occupant has left the "keep out zone." For this, the triggering decision is held at the output of function module 4.1 for a longer period of time via a holding element 11. Should two-stage side airbags be used in the future, it is furthermore conceivable, for example, to suppress only the second stage of the side airbag using this method instead of completely suppressing the side airbag.

REFERENCE NUMERALS

1 sensor
2 sensor
3 function module
4 control unit
5 sensor
6 sensor
7 sensor
8 sensor
9 restraining means
10 function module
11 holding element
20 function module
21 status monitor
22 status monitor
100 safety system

What is claimed is:

1. A safety system for at least one occupant of a vehicle, comprising:
    at least one status monitor for determining a position of the vehicle occupant;
    a first sensor for detecting an acceleration of the vehicle and a second sensor for detecting at least one of a weight and a center of gravity of the vehicle occupant, output signals of the first and second sensors being conveyed to the status monitor, wherein the status monitor determines the position of the vehicle occupant based on the output signals of the first and second sensors; and
    a control unit configured to receive (i) an output signal of the status monitor regarding the determined position of the vehicle occupant, and (ii) the output signal of the first sensor for detecting the acceleration of the vehicle, wherein the control unit controls activation of a restraining device based on the output signal of the status monitor and the output signal of the first sensor.

2. The safety system according to claim 1, wherein the at least one status monitor includes a Luenberger observer.

3. The safety system according to claim 1, wherein the at least one status monitor includes a Kalman filter.

4. A safety system for at least one occupant of a vehicle, comprising:
    at least one status monitor for determining a position of the vehicle occupant;

sensors for detecting an acceleration of the vehicle and at least one of a weight and a center of gravity of the vehicle occupant, output signals of the sensors being conveyed to the status monitor; and a second status monitor for receiving the output signals of the sensors that measure the acceleration of the vehicle.

5. A safety system for at least one occupant of a vehicle, comprising:

at least one status monitor for determining a position of the vehicle occupant;

sensors for detecting an acceleration of the vehicle and at least one of a weight and a center of gravity of the vehicle occupant, output signals of the sensors being conveyed to the status monitor; and a control unit to which the output signals of the at least one status monitor are conveyed, and wherein the control unit ascertains from the output signals whether the vehicle occupant is situated in a predetermined space for which a restraining device is not activated in the event the vehicle occupant is situated in the predetermined space.

6. The safety system according to claim 5, further comprising a function module for ascertaining a presence of at least one of a side crash and a rollover crash from the sensor signals.

7. The safety system according to claim 6, further comprising a further function module for processing output signals of the control unit and the function module.

8. The safety system according to claim 7, further comprising a holding element situated between the function module and the further function module.

9. A method for controlling a safety system for at least one occupant of a vehicle, comprising:

detecting a position of the vehicle occupant by at least one status monitor, wherein the status monitor detects the position of the vehicle occupant by analyzing sensor signals of a first sensor which detects an acceleration of the vehicle and a second sensor which detects at least one of a weight and a center of gravity of the vehicle occupant; and triggering, by a control unit, a restraining device as a function of the position of the vehicle occupant and the signal of the first sensor which detects the acceleration of the vehicle.

10. The method according to claim 9, further comprising:

detecting a behavior of the occupant in the form of a model, at least the weight of the occupant, a movement of the center of gravity of the occupant, and a link of the occupant to the vehicle being taken into account in the model.

11. A method for controlling a safety system for at least one occupant of a vehicle, comprising:

detecting a position of the vehicle occupant by at least one status monitor, which analyzes sensor signals of sensors that detect an acceleration of the vehicle and at least one of a weight and a center of gravity of the vehicle occupant; and triggering a restraining device as a function of the position of the vehicle occupant;

wherein the position of the vehicle occupant is detected by first and second status monitors, the first status monitor analyzing output signals of the sensors which detect the acceleration of the vehicle and the weight of the vehicle occupant, and the second status monitor detecting the acceleration of the vehicle.

* * * * *